United States Patent [19]

Bristol et al.

[11] Patent Number: 5,043,863
[45] Date of Patent: Aug. 27, 1991

[54] MULTIVARIABLE ADAPTIVE FEEDFORWARD CONTROLLER

[75] Inventors: Edgar H. Bristol, Foxboro; Peter D. Hansen, Wellesley Hills, both of Mass.

[73] Assignee: The Foxboro Company, Foxboro, Mass.

[21] Appl. No.: 355,026

[22] Filed: May 2, 1989

Related U.S. Application Data

[63] Continuation of Ser. No. 31,964, Mar. 30, 1987.

[51] Int. Cl.$^5$ .................. G06F 15/46; G05B 13/04
[52] U.S. Cl. .................................. 364/165; 364/151; 364/157; 364/177
[58] Field of Search .............................. 364/148–151, 364/157–159, 164, 165, 153, 156, 176, 177, 183; 318/561

[56] References Cited

U.S. PATENT DOCUMENTS

| 4,349,869 | 9/1982 | Prett et al. | 364/159 |
| 4,489,376 | 12/1984 | Putman | 364/165 |
| 4,563,735 | 1/1986 | Hiroi et al. | 364/165 |
| 4,651,272 | 3/1987 | El-Ibiary et al. | 364/165 |
| 4,698,745 | 10/1987 | Hiroi et al. | 364/165 |
| 4,754,410 | 6/1988 | Leech et al. | 364/165 X |

FOREIGN PATENT DOCUMENTS 0152871 8/1985 European Pat. Off. .

Primary Examiner—Joseph Ruggiero
Attorney, Agent, or Firm—Wigman & Cohen

[57] ABSTRACT

Multivariable adaptive feedforward control may be accomplished by detecting the beginning and ending of load transients, characterizing the inputs and process result during the transient by moments, and relating the characterized inputs and process result in a general transfer function model to generate transfer functions relating the input to the output. The transfer functions coefficients are refined with successive disturbances by projecting from the current solution to the nearest point in an updated solution space. The transfer function coefficients of the selected solution are then used in compensators acting on the feedforward inputs to adjust a process control output to counteract the anticipated effects of the inputs.

37 Claims, 4 Drawing Sheets

MULTIVARIABLE ADAPTIVE FEEDFORWARD CONTROLLER

This is a continuation of co-pending application Ser. No. 07/031,964 filed on 03/30/87 now abandoned.

BACKGROUND OF THE INVENTION

1. Technical Field

The invention relates generally to control devices for controlling industrial or similar processes and particularly to self-tuning controllers. More particularly, the invention concerns feedforward controllers wherein operating parameters are developed in response to changes in the process inputs.

2. Background Art

Control systems regulate many material, energy and guidance systems. The home heat control thermostat is a familiar example. More sophisticated devices are used in refineries, and complex industrial facilities, where input materials are processed into products. Feedback and feedforward mechanisms are used to assure accurate production despite variations in the inputs, or changes in the desired output. Feedback control is the more common control method. Feedback compares the system output, called the controlled variable, with the desired output, called the set point, to generate an error value. The size and direction of error are used to correct the system response towards the desired output. Since feedback response to a load disturbance occurs after a change in the controlled variable has been sensed, the system is frequently not exactly on target. Mistuning by operators and changed system characteristics are additional sources for system error.

Recently self-tuning or adaptive feedback control systems have been developed that use abstract rules to reset the tuning of a control system as the device learns from its experience with the process. An adaptive system adjusts its control parameters as the process changes. Adaptive feedback controllers can be connected, turned on, and left to tune and retune themselves to provide consistently better control than manually adjusted controllers. As a result adaptive feedback controllers are increasingly used in industry.

Feedforward control is a rarer and more specialized control method. Feedforward recognizes that upsets in the inputs to the system can be used to adjust the system devices in anticipation of or simultaneously with the arrival of those upsets. If all the load variables for a particular process are sensed, transmitted and responded to without error, and if the relationship between manipulated and measured variables is exactly known, then perfect control is theoretically possible provided the ideal feedforward controller is stable and physically realizable.

Feedforward control is usually accomplished in one of two ways. One requires finding a process equation describing the controlled variable as a function of the load variables, manipulated variables and set point. Several relationships are used to balance the input and output material and energy in conjunction with other inferential or empirical relationships. The process equations provide a basis for a general transfer function relating the inputs to process results. Once the transfer function is formulated, load signals are processed by a compensator to generate a control action that preadjusts the manipulated variable in anticipation of the controlled variable's response to the load variations. Implementation of traditional feedforward then requires specific engineering of the particular process equations.

A second feedforward method presumes some generalized model for which coefficients of model terms are adjusted according to actual conditions. The generalized model is then specialized according to empirical methods. A generalized description usually requires complex mathematical processing which is exacerbated as the number of terms increase with the loads sensed. Such complexity requires more computing time and equipment for a specifically defined process. Since the generalized model is not restrained like a standard process equation is, for example, by a material energy balance equation, inaccuracies in the model must be specifically corrected. Practical implementation of generalized models then often leads to slow or inadequately performing devices.

Adaptive control techniques also make presumptions about the load and process to establish descriptive equations directed at exact models. In the immediate control procedure, time sampled data is applied continuously to the model to generate a control signal for the manipulated variable. For adaptation, the control model is continuously updated with each sample according to error evaluation procedures. The sample data driving the model is then concerned with the immediate present, the current values, and current rates of change, and how these cause an error between the model and the process. Unfortunately the narrow time frame of continuous models necessarily leads to the processing of the measurement noise along with any true system changes. Overly rapid adaptation to measurement noise in a feedforward system leads to inaccurate and erratic feedforward performance while failure to adapt quickly enough prevents timely adjustment of the feedforward controller allowing it to keep pace with a changing process.

Typically, load and manipulated variables enter the process at different locations and have process effects that are spread over time. Processes usually respond slowly, integrating load variations over time. The process response is then a time smearing of the inputs, making relations between the inputs and outputs complex. As a result data snapshots and static models are blind to the history of the process without memory of previous events. However, a broad time frame can average real information into insignificance. A problem then exists with the degree of influence prior events should have.

One method to correct feedforward control errors is to join a feedback controller with the feedforward device. Cumulative errors in the feedforward control cause the controlled variable to be offset from the set point. The feedback controller corrects the error, forcing the controlled variable to the set point. Feedback control corrects the feedforward offset error, but in doing so may disguise system response making proper feedforward adaptation difficult. Coordination between the feedforward and feedback actions can then be a problem, especially in an adaptive system.

Other problems have inhibited feedforward control deployment, especially in a multivariable adaptive form. Measurements may be inaccurate. Sensing all the loads may be impossible or excessively expensive. Models are never perfect in practice. Model relations may be unsolvable in an exact form, or time varying due to equipment wear. Model complexity may slow the computation, thereby limiting response time, or the number of loads controllable. Computational errors may occur or accumulate over time. Computational resources proportional to the square of the number of loads sensed may be required. The device may be ignorant of events having variable or unknown time duration. The device may not adapt correctly to all data particularly when several loads have related response results. The device may behave erratically with incomplete data. The device may not coordinate well with feedback controls and may act in conflict. Human intervention may be required to tune and retune the device.

It is believed few or no other practical general purpose adaptive feedforward controllers presently exist.

It is therefore an objective of the present invention to provide a robust adaptive feedforward controller.

It is an objective to provide a device wherein variations in the system relations, and variations in the timing attributes are accommodated by the adaptive feedforward control while at the same time accommodating load variations.

It is an objective to provide a control device that operates with incomplete data.

It is an objective to provide an adaptive controller for a number of disturbance variables whose rate of adaptation is reasonably quick with few disturbances on only subsets of the inputs.

DISCLOSURE OF THE INVENTION

A method and apparatus have been developed for multivariable adaptive feedforward control wherein naturally occurring transients are detected and characterized. The signal transient characterizations give coefficients for process model transfer functions convergeable to the actual process transfer functions. Projection between successive solutions provides converging control in a multivariable system even with incomplete data. The process transfer function coefficients are used to develop feedforward compensation of the process inputs to correctly counteract input changes to the process.

The apparatus includes sensors for measuring the inputs of a process and detecting disturbances, means for measuring a controlled variable of the process, means for reducing the measured values to control coefficients, and means for subsequently refining the control coefficients to increasingly more accurate values. The apparatus receives process inputs and outputs to adaptively determine compensation coefficients for compensating the load signals; and generates an adapted feedforward control signal from the compensated input signals. Inputs to a process are examined to detect disturbance events. A disturbance and the process response are mathematically characterized according to a chosen series description until an end of the process response is determined. The two descriptions are then related on a term-by-term basis, allowing the formation of transfer functions to compensate future load variations. The use of whole disturbance events allows periodic updating of a differential equation model based on significant process data. Disturbances are mathematically characterized by moment relations, and control relations are achieved by projection methods. The present method and apparatus thereby provides a multivariable adaptive feedforward controller designed to satisfy the aforementioned needs.

Like items are marked by like numerals or indicators on the drawings.

BEST MODE FOR CARRYING OUT THE INVENTION

Figure 1:
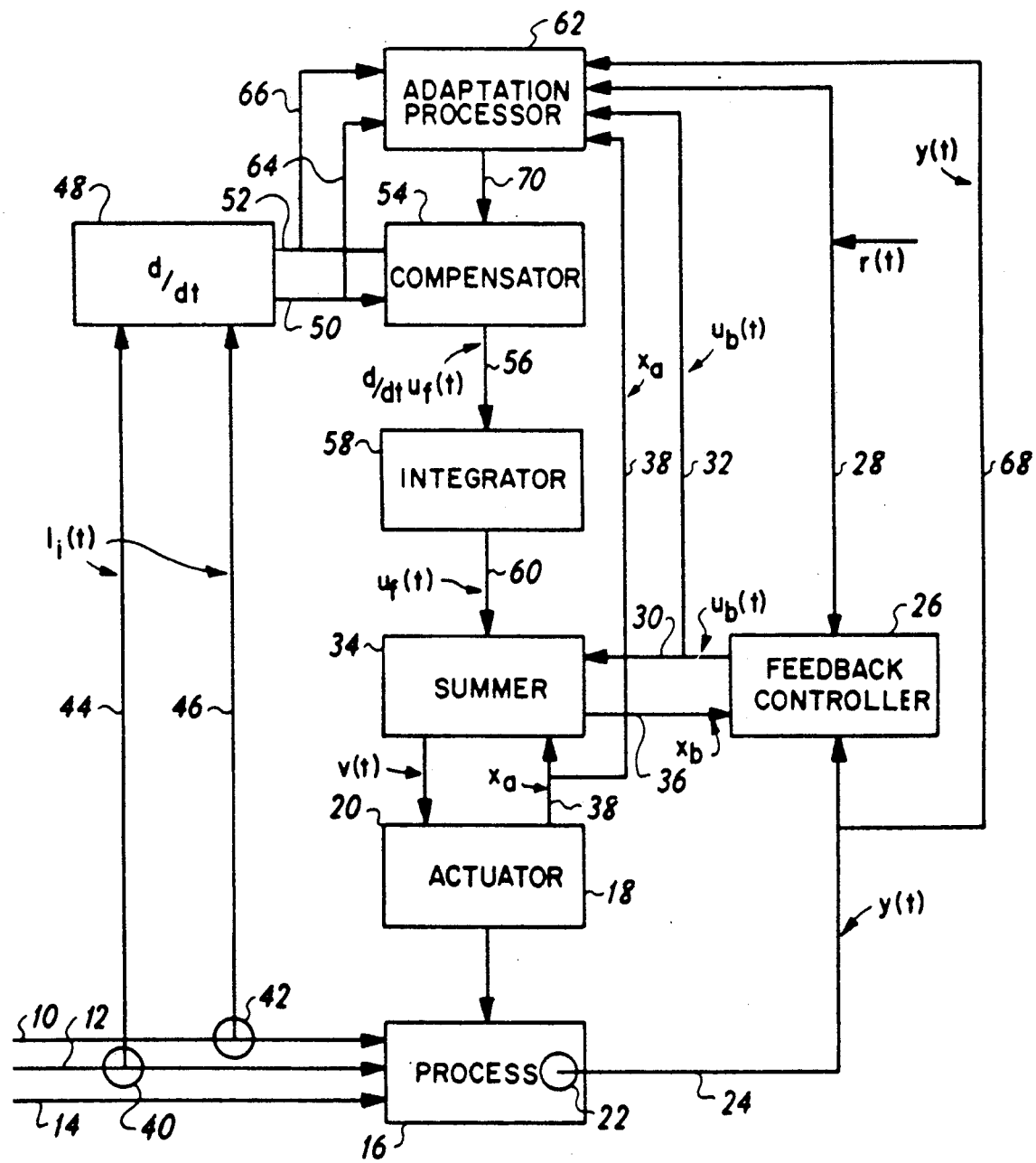
FIG. 1 is a block diagram depicting a basic embodiment of the present invention in a feedforward control environment.

FIG. 1 is a block diagram depicting a basic embodiment of the present invention in a feedforward control environment. A series of process loads 10, 12, 14 join to influence a process 16 having an unknown transfer function. The process 16 in response to the loads 10, 12, 14 and a final control signal $v(t)$ on lead 20 affecting an actuator 18 produces a time-varying process condition to be controlled which is detected by a sensor 22. The sensor 22 generates a corresponding measurement signal $y(t)$ on leads 24 and 68, also called a feedback signal, which is typically digitally converted and filtered by known circuit means (not shown) before being returned to a feedback controller 26.

The feedback controller 26 receives along with the measurement signal $y(t)$, a set point signal $r(t)$ on lead 28 indicating the desired process result for the measurement signal $y(t)$. The feedback controller 26 then computes a feedback control signal $u_b(t)$ on lead 30, which is supplied to a summer 34, and in one alternative to a feedforward adaptation processor 62 on lead 32. The feedback controller 26 may be of any ordinary design, which is useful aspect of the embodiment of FIG. 1. A simple feedback controller 26 might compute the difference between the set point signal $r(t)$ and output measurement signal $y(t)$ to generate the feedback control signal $u_b(t)$ as a mere amplified error signal. Feedback control commonly includes proportional, integral, and derivative functions, and other more complex feedback signals are known in the art and are contemplated here. The preferred feedback controller 26 includes such more complex functions and is further equipped with standard means to receive a returning external feedback signal $x_b$ on lead 36 to complete a feedback loop implementing the feedback controller action that produces control signal $u_b(t)$ on lead 30. The preferred feedback signal provided to the adaptation processor 62, is the external feedback signal $x_b$ on lead 38. A number of the input loads 10 and 12 are monitored by input sensors 40 and 42, providing time-variant load signals $l_i(t)$ on leads 44 and 46. The monitored inputs are indexed here by the subscript i, ranging from one to n, where n is the number of monitored inputs. The load signals $l_i(t)$ are typically digitally converted and filtered by known circuit means (not shown). In the preferred embodiment, the load signals $l_i(t)$ are then differentiated as required by known means 48 which is equivalent to other differentiation means incorporated in the elements of the system including the adaptation processor 62.

Not all the loads must be measured in the embodiment, as exampled by load 14. Unmeasured loads are expected, and are treated here cumulatively as a single unmeasured load signal, $l_u$. Effective feedforward adaptation occurs despite such incomplete data.

The load signals $l_i(t)$ are supplied to a compensator 54. The preferred embodiment of the compensator 54 includes a microprocessor having memory and calculation portions, but other fixed function electronic devices are contemplated as equivalent embodiments. The compensator 54 includes signal processing means for transforming each measured load signal $l_i(t)$ into a component of a feedforward control signal $u_f(t)$. Compensator 54 receives each load signal $l_i(t)$ derivative, and generates a compensation for each load signal $l_i(t)$ derivative according to a transfer function $A_i$ defined by a series of compensation coefficients $a_{ij}$. The coefficients $a_{ij}$ may be viewed as coefficients in a polynomial series of a Laplace transform. The subscript i refers to the load signal $l_i$ and the subscript j refers to the jth element of the series. The load signals li(t) are operated on by the compensation operators represented by the transfer functions $A_i$ to produce compensated load signals $C_i = A_i L_i$ where $A_i$ are transfer functions and $L_i$ are Laplace transforms of the load signals $l_i(t)$. The compensated load signals $C_i$ are cumulated into a single feedforward control signal $u_f(t)$ ($= \Sigma C_i$). Where the load signals $l_i(t)$ are differentiated 48, the compensated total, referred to as d/dt $u_f(t)$ on lead 56, is integrated in an integrator 58 of known circuit means to produce the feedforward control signal $u_f(t)$ on lead 60.

The feedforward control signal $u_f(t)$ on lead 60 is combined with the feedback control signal $u_b(t)$ on lead 30 in the summer 34 to produce a final control signal $v(t) = (u_f(t) + u_b(t))$ on lead 20 which is supplied to the actuator 18 affecting the process 16.

Figure 2:
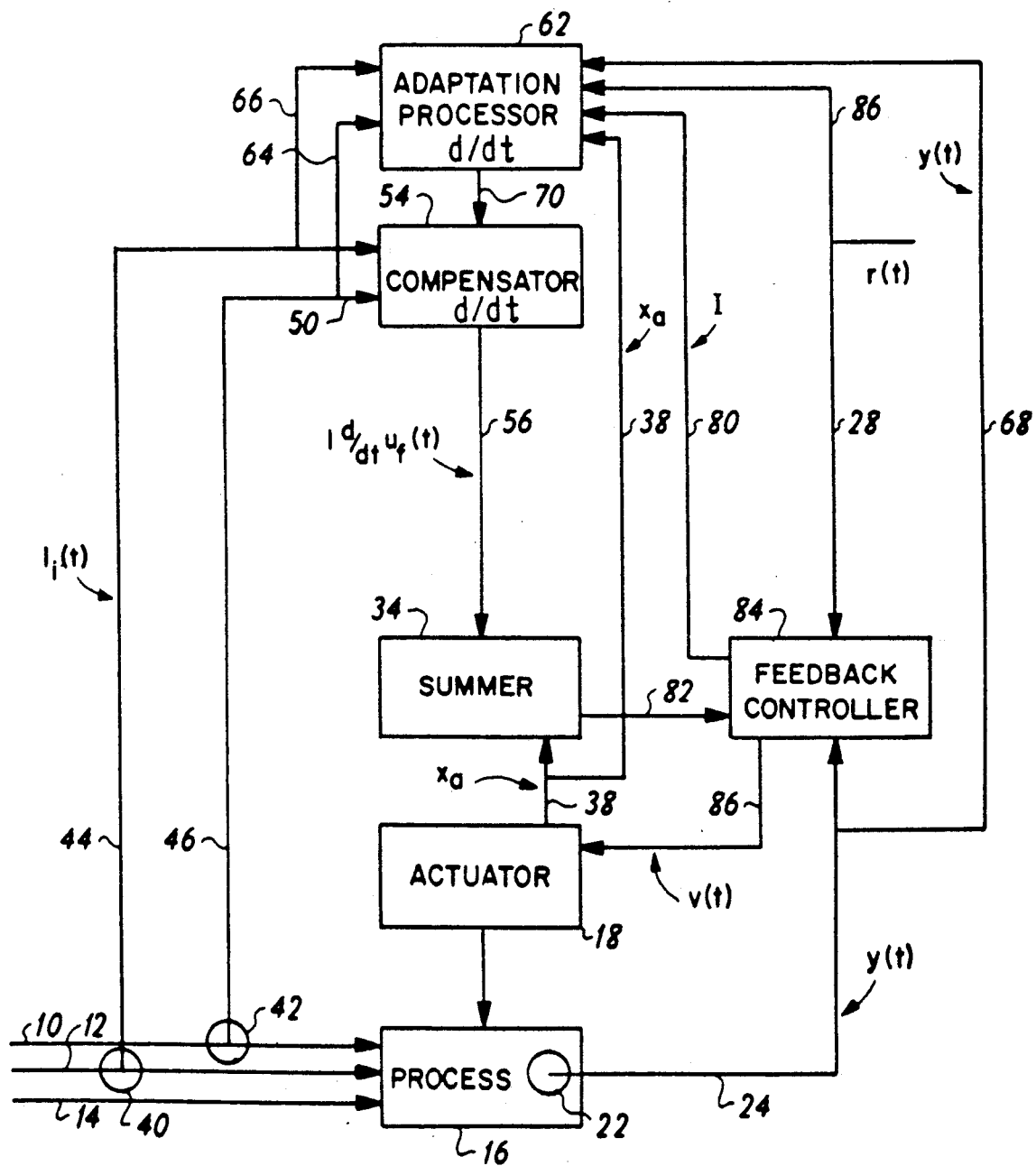
FIG. 2 is a block diagram depicting a preferred embodiment of the present invention in a feedforward control environment.

The actual response of the actuator 18 is measured to produce an external actuator measurement signal $x_a$ on lead 38. In the simplest case, the external actuator measurement signal $x_a$ may be taken directly from the final control signal $v(t)$ on lead 20. The external actuator measurement signal $x_a$ on lead 38 is supplied to the summer 34. Summer 34 which combines feedback control signal $u_b(t)$ and feedforward control signal $u_f(t)$ to compute the final control signal $v(t)$ on lead 20, also back calculates the true response of the actuator 18 to the feedback control signal $u_b(t)$ on lead 30 by removing the feedforward control signal $u_f(t)$ on lead 60 from the external actuator measurement signal $x_a$ on lead 38 to produce the external feedback signal xb on lead 36. The external feedback signal $x_b$ on lead 36 is returned to the feedback controller 26. The preferred method uses the external feedback signal $x_a$ on lead 38 as the measure of the feedback control action directed to the adaption processor 62. Alternatively, although less preferred, the feedback control signal $u_b(t)$ 32 or the external feedback signal $x_b$ 36 may be supplied to adaptation processor 62. The proportional P, integral I and derivative D terms can be supplied manually to the adaptation processor 62 or directly supplied from the feedback controller 26 on lead 80 (FIG. 2).

The load signals $l_i(t)$ and its derivatives on leads 50 and 52 are also supplied to the adaptation processor 62 on leads 64 and 66. The adaptation processor 62 comprises in the preferred form a microprocessor having memory and calculation portions. The adaptation processor 62 receives the measured load signals $l_i(t)$, the measurement signal $y(t)$ on lead 68 and the external actuator measurement signal $x_a$ on lead 38. FIG. 1 shows both the feedback control signal $u_b(t)$ and the external feedback control signal $x_a$ connected to adaptation processor 62 although only one is needed. Variations in the process input variables, the load signals $l_i(t)$ and the external feedback signal $x_a(t)$, are then related to the measurement signal $y(t)$ to generate series coefficients $a_{ij}$ for the compensator 54. Newly generated coefficients $a_{ij}$ are transferred over lead 70 to compensator 54 to update the feedforward compensation process of compensator 54.

Summary operation of the embodiment shown in FIG. 1 occurs as follows. A set point signal r(t) is applied to the feedback controller 26 along with the process measurement signal y(t). The feedback controller 26 generates a feedback control signal $u_b(t)$. The feedback signal $u_b(t)$ is supplied to the summer 34 providing feedback control. Initially the compensators are unadapted and null, so no feedforward control signal $u_f(t)$ is received from compensator 54, and only feedback control is used ($u_f(t) = 0$, $u_b(t) = v(t)$). The feedback controller 26 acts to match the actual measurement signal y(t) to the desired set point signal r(t). The final control signal v(t) on lead 20 is compared with the external actuator measurement signal $x_a$ 38 to check that the expected result occurred. If the actuator unexpectedly bounded, the external actuator measurement signal $x_a$ 38 indicates the bounding. The external feedback signal $x_b$ on lead 36 is normally equal to feedback control signal $u_b(t)$ on lead 32 unless limiting causes the external actuator measurement signal $x_a$ 38 to differ from the final control signal v(t) on lead 20.

The process manipulated variable $x_a(t)$ is supplied to the adaptation processor 62 along with the measurement signal y(t) on lead 68 to refine a process model. The preferred process manipulated variable signal is taken from the external actuator signal $x_a$ on lead 38.

Concurrently with control, disturbances in the load signals $l_i(t)$ are sought by the adaptation processor 62. Transient changes in the inputs can be related to transient changes in the output (measurement signal y) to determine the process response relation. The adaptation processor recognizes the start of a transient as a change in a measured process input from a previous settled or steady state condition and subsequently determines an end condition as the return of the measured process variable y to a settled or steady state condition equal to the set point r(t). The input signals are mathematically characterized and related to the mathematically characterized process response to generate compensation coefficients.

When a disturbance is detected, the adaptation processor 62 initializes the disturbance adaptation. If desired, the control system may adjust for the effect of feedforward compensation on feedback adaptation, for example, by disabling independent feedback adaptation action when transient disturbances in the load signals are recognized. Where feedforward adaptation leaves an error in the dynamic compensation, the feedback control may provide a redundant control, so scaling down the feedback control while the feedforward controller adapts the control coefficients to the load transients may be desirable.

Once a disturbance event is sensed, an estimate of the likely duration of the response time of the process variable y(t) to the transient is made. The transient's progress is then watched by the adaptation processor 62 while simultaneously being numerically characterized. The duration estimate is used to determine when tests for the transient's end are made. After a first response has settled, a first approximation of feedforward control is adapted and supplied as a series of compensation coefficients $a_{ij}$ to the compensator 54 along lead 70. However, if settling does not occur in a reasonable period, set by a disturbance response time estimate, the compensator coefficients may not be updated.

The feedforward compensator 54 includes an approximation of the process transfer function as adapted from the last sensed transient. The transfer function may be represented as a sum, $C = \Sigma C_i = \Sigma A_i L_i$, where the $A_i$ transfer functions are characterized by coefficients $a_{ij}$ held in the compensator's memory.

The compensator 54 continuously receives the load signals $l_i(t)$ on leads 50 and 52, and calculates for each load signal $l_i(t)$ a compensated signal $C_i$ according to the transfer function $C_i = A_i L_i$, $L_i$ being the Laplace transform of $l_i(t)$, to generate feedforward compensation components for the feedforward control signal $u_f(t)$. Once the initial compensation coefficients are received, the current load signals $l_i(t)$ are individually compensated, and accumulated into a feedforward control signal $u_f(t)$.

The feedforward control signal $u_f(t)$ is combined with the feedback signal $u_b(t)$ to form the final control signal $v(t)$: $(v(t) = u_f(t) + u_b(t))$. Less change in feedback control signal $u_b(t)$ is required once the feedforward control signal $u_f(t)$ starts having an effect.

Following the disturbance, an updated approximation $a_{ij}$ of the ideal feedforward control is applied to the loads $l_i(t)$ through the compensator 54 and actuator 18.

The adaptation processor 62 monitoring each subsequent disturbance characterizes the process inputs and outputs in preparation for updating the feedforward coefficients $a_{ij}$ again.

Again, once the subsequent disturbance ends, the newly adapted compensating coefficients are supplied to the compensator 54. With the proper compensation functions $A_i$, the compensator 54 acts on the load signal $l_i(t)$ to correctly offset the process response to the actual loads. The feedforward control signal $u_f(t)$ then modifies the process 16 through the actuator 18 so the process measurement signal $y(t)$ in time tracks closer to the set point signal $r(t)$ despite load signal $l_i(t)$ variations. The feedback control signal $u_b(t)$ change is thereby minimized in response to load signal $l_i(t)$ upsets. The burden of responding to measured load disturbances is then progressively shifted from the feedback portion to the feedforward portion of the apparatus as the feedforward parameters converge to an ideal adaptation with successive transients. Correction for controller output bias can be provided by feedback control which also corrects unmeasured and imperfectly compensated disturbances.

Three problems are accommodated with the implementation shown in FIG. 1. If one changes the compensator coefficients when they act directly on the load signals $l_i(t)$, then updating the compensation alters the feedforward control signal $u_f(t)$ thereby bumping an already settled process. However, when the load signal $l_i(t)$ is differentiated prior to compensation and integrated afterwards, updating the compensation while the loads are settled does not change the feedforward control signal $u_f$ and does not bump the settled process. Differentiating and reintegrating may be done digitally by taking the difference in successive samples for each signal and summing each newly calculated change in feedforward control signal with the previous sum. When the process is at steady-state the newly calculated change is zero. Where more than one signal is compensated, the several compensated signals should be summed then integrated as a group. An offset in the integrated value may be corrected by the feedback control.

Differentiating and reintegrating are preferred aspects of the present method, but are not essential. Another solution is to anticipate returning bumps before they occur and separately apply an offsetting value within the feedforward compensator 54 or the feedback controller.

Another problem accommodated with the implementation shown in FIG. 1 is feedback control integral windup. This occurs when the controller is bounded in its ability to adjust the process output. A cure is to back-calculate the integral feedback input. The combined feedforward signal is subtracted from the external actuator measurement signal $x_a$ on lead 38 to compute an external feedback signal $x_b$ on lead 36 returned to the feedback controller 26. It is part of feedback control art to provide an external feedback signal $x_b$ on lead 36 to inform the feedback controller of the true effect of the control action, so the feedback controller recognizes the physical bounds (of an actuator or other controller means) and does not integrate the compensated control signal indefinitely.

A third problem not accommodated with the implementation shown in FIG. 1 is independent integrator drift. Because the feedforward control signal is separately integrated, the integrated feedforward control signal $u_f(t)$ on lead 60 has an arbitrary base, and drift in the absolute value of the signal may occur, ultimately causing the feedforward or feedback portion to reach a physical bound. The feedback and feedforward portions will drift in opposite directions as feedback attempts to balance the drift. As a result, one or both of the control sections may bound needlessly. A cure is to leave the combined final control signal $v(t)$ on lead 20 unchanged, but shift between controls by oppositely biasing the feedback control signal $u_b(t)$ and the feedforward control signal $u_f(t)$.

When the feedback control output signal $u_b(t)$ on lead 30 or the feedforward signal $u_f$ on lead 60 reaches its bound, the signals are adjusted to reduce the feedback control signal $u_b(t)$ and increase the feedforward control signal $u_f(t)$ (or the reverse) so that while the final control signal $v(t)$ is unchanged, the feedback control signal $u_b(t)$ and the feedforward signal $u_f(t)$ are brought within their bounds.

FIG. 2 shows a preferred embodiment combining feedback and feedforward to implement external feedback functions and eliminate windup and integrator drift. The structure in FIG. 2 corresponds for the most part to the structure shown in FIG. 1. The adaptation processor 62 receives the load signals $l_i(t)$, the set point signal $r(t)$ (on lead 86), and the measurement signal $y(t)$. The external actuator measurement signal $x_a$ is received on lead 38, and is used as a measure of the manipulated input to the process. The adaptation processor 62 receives the integral time constant (I), proportional band (P), and derivative time (D) from feedback controller 84 on lead 80. The integral time constant I is applied at a convenient point in either the adaptation processor 62 or the compensator 54 so the compensated output (56) from compensator 54 comprises the product of the feedforward control signal $d/dt\ u_f(t)$ and the integral time, I. The product is supplied on lead 56 to the summer 34, where it is added to the external actuator measurement signal $x_a$ on lead 38. The sum, $(I)(d/dt\ u_f(t)) + x_a$, is supplied on lead 82 to the feedback controller 84.

The feedback controller 84 preferably includes standard hardware and processing functions to operate with proportional, integral and derivative functions. Feedback controller 84 also receives the measurement signal y(t) on lead 24, and the set point signal r(t) on lead 28 as in the embodiment of FIG. 1. In the preferred embodiment the feedback controller 84 partially develops a feedback control signal to a point where the differentiated feedforward signal product and external actuator measurement sum, $(I)(d/dt\ u_f(t)) + x_a$ may be added, to produce the final control signal v(t). The final control signal v(t) is then supplied to the actuator 18 on lead 86.

Figure 3:
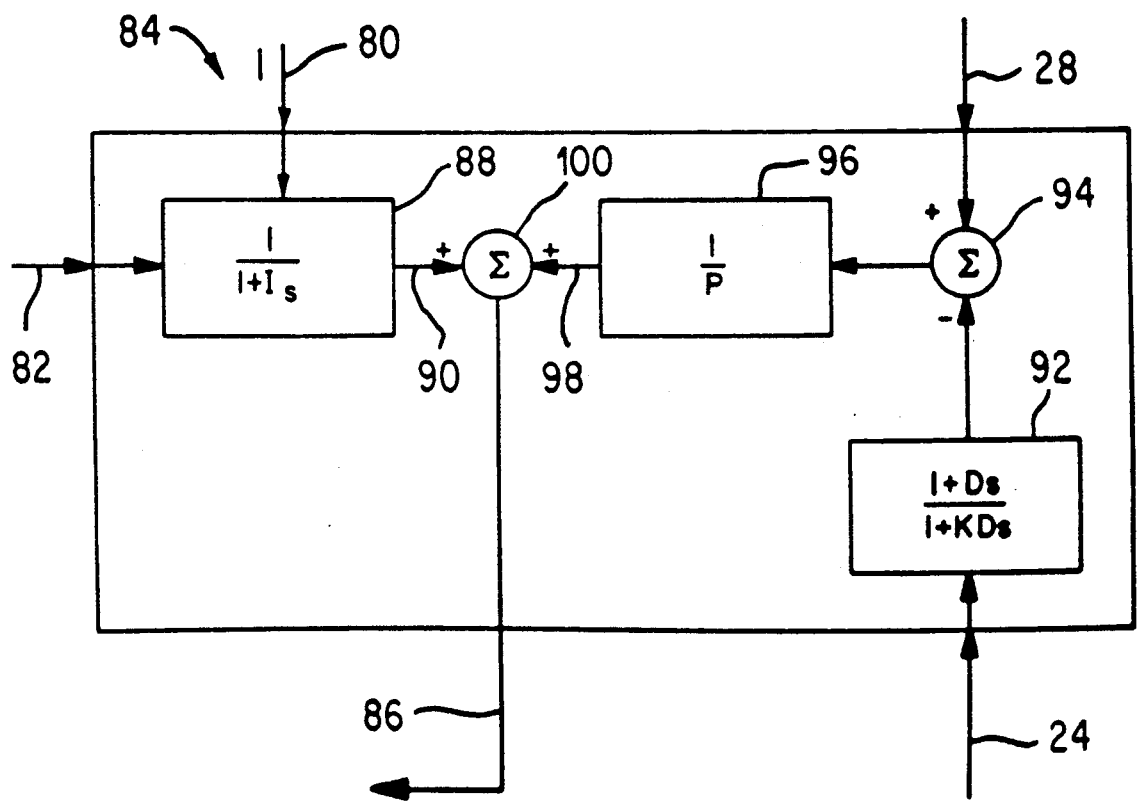
FIG. 3 control diagram of a section of FIG. 2.

FIG. 3 shows a control diagram of the preferred combined integration of the feedforward and feedback signals (82, 98 respectively) to produce antiwindup protection in the feedback controller 84.

The differentiated feedforward control signal multiplied by the integral time, combined with the external actuator measurement signal $(I)(d/dt\ u_f(t)) + x_a$ is input to a lag function block 88. The lag function block 88 lags the input sum to produce a lagged signal on lead 90.

Simultaneously, the measurement signal y(t) on lead 24 is operated on by a derivative block 92. The result is subtracted from the set point signal r(t) in differencer 94. The difference is then multiplied by a proportional band block 96 to form a partially developed feedback control signal on lead 98.

The lagged signal on lead 90 is then combined with the partially developed feedback control signal on lead 98 in a summer 100. The sum is supplied to the actuator 18 on lead 86 as the final control signal v(t).

The final control signal v(t) is returned either directly or by a measurement of the response to the final control signal v(t), as the external actuator measurement signal $x_a$ on lead 38. In either case, the effect of the final control signal v(t) on lead 86, is returned on lead 38 through the summer 34 to the input of lag function 88, closing a unity gain feedback loop for integration. The result is to produce a final control signal v(t) on lead 86 that is the sum of the feedforward and feedback signals, $v(t) = u_f(t) + u_b(t)$ that is constrained by the actuator's limits to remain within the range of the actuator.

Feeding back the actuator signal $x_a$ and feedforward signals through a lag function 88 prevents integrator windup, since a limited external actuator measurement signal $x_a$ 38, stops further integration. Finally, integration occurs in one place, instead of several, thereby obviating coordinating separate integrators. Different feedback controllers may require different signal treatments to integrate the combination of the feedforward control signal and feedback control signals.

Turning to the function of the adaptation processor 62, the control system samples the load signals $l_i(t)$, the measurement signal y(t), and the actuator measurement signal $x_a$ at regular intervals. The signal samples are converted to a fixed range for calculation of 0-100%, corresponding to the ranges of the source signals. Each sampled and converted feedforward signal is applied to a corresponding compensator having a transfer function to transform the signal to a feedforward control signal component. These compensators are included in the compensator element 54.

The compensators may be any of several commonly used elemental feedforward compensators, as the lead, lag, or deadtime compensators, or combinations thereof chosen to compensate the low frequency behavior of the process. Including higher order leads and lags may improve higher frequency dynamic control, but otherwise has no positive effect on important low frequency control; or the effectiveness and safety of the design. Each compensator has adjustable coefficients whose values determine a compensated output in response to the corresponding load signal $l_i(t)$ input.

CALCULATION OF COMPENSATION COEFFICIENTS

In order to calculate the compensation coefficients we take the discrete data $(l_i(t), y(t), x_a)$ and calculate moments which characterize the signals. These moments are used to calculate the coefficients of a series expansion of a model relating process inputs to output. The model coefficients are used to determine the compensator structure (lead, lag or derivative) and to calculate the coefficients for a discrete time compensator.

MOMENT CALCULATIONS

A disturbance in a measured load or set point starts the characterization of the load signals, the process measurement signal y(t) and final control signal $x_a(t)$, so they may be related in a process model. Numerous signal characterizations are possible, including general series characterizations as Taylor series, other polynomial series and Fourier series. Where a series form is assumed, as in this embodiment, the coefficients are all that are necessary for subsequently relating the inputs by modelling means to the output.

With multiple load signals and several degrees of moments, a series of equations are solved for the multiple compensation coefficients.

The input process variable signals are characterized by time moments. As the disturbance is running in the response signal, moment calculations are performed on the differentiated signals to generate moments that are proportional to the Taylor series coefficients of the variable's Laplace transforms. Any number of terms may be included in the characterization. Low order terms are usually more important, and depending on the signal and the process, inclusion of high order terms are increasingly affected by noise features. The equations appear at the corresponding number in the appendix following the specification.

The system at the start of a disturbance stores the pre-existing process measurement signal y(t), the final control signal $x_a(t)$, and each load signal $l_i(t)$, and zeros all corresponding moment data. The computation is based on the moments of the sampled time signals, where (Equation 1)

(Equation 2)

(Equation 3)

(Equation 4)

Equations (3) and (7) are not required in the preferred embodiment of the invention as expressed in reference to FIG. 2.

The $n^{th}$ normalized moments for a Laplace transform are then calculated for each sample by the expressions, (Equation 5)

(Equation 6)

(Equation 7)

(Equation 8)

respectively, where n is a positive integer or zero for the degree of the moment and j counts the sample time from the disturbance start. The $t_c$ term is an arbitrary scaling time measured in sampling intervals. An effect of the scaling time $t_c$ is to remove the sampling time dimension from the normalized moments.

Where samples are taken at regular intervals, counting the samples serves as a disturbance timer. When a steady state is reached by settling, the subsequent contributions are nearly zero, so the summation indicated in equations (5) through (8) need not be carried out indefinitely, but may be terminated. The normalized moment values then characterize the disturbance and response.

MODEL IDENTIFICATION

Having the new disturbance characterizations, the model transfer function relations can be updated. In the following discussion the relation between the inputs and process response is developed and solved for in terms of a model.

The process transfer function model is expressed by the equation (Equation 9)

or alternatively (Equation 10)

where Y, $x_a$, $L_i$, and $L_u$ are the transforms of the measurement signal $y(t)$, final control $x_a(t)$, measured loads $l_i(t)$ and the unmeasured load $l_u$, and wherein $A_y$, $A_i$, and $A_u$ are the transfer functions of the measurement, measured load, and unmeasured loads corresponding to the actual process conditions.

Equation (9) defines a process where the process measurement signal $y(t)$ is derived as a linear sum of the control signal $x_a(t)$, the unmeasured load signal $l_u$, and the load signal $l_i(t)$, each modified by dynamic process elements with corresponding transfer functions $A_u$, $A_i$, and $A_y$. Other models may be used where the process measurement signal $y(t)$ results from a linear sum of transformed inputs.

Equation (10) may be reexpressed in terms of the changes $E_i$, $E_y$, and $E_u$ in the model transfer functions, which are the difference between the current solution (k) and the previous solution (k−1). For example, the change in unmeasured load model transfer function may be expressed as:

(Equation 11)

Solving equation (10) for the controlled variable, the object of the prediction, substituting equation (11) into equation (10), results as follows:

(Equation 12)

(Equation 13)

The change for the unmeasured disturbance is assumed to equal all of the unmeasured disturbance ($E_u = A_u(k)$, $A_u(k-1) = 0$). Assuming $a_u(k-1) = 0$ and omitting the k−1 qualifiers equation (13) can be contracted to:

(Equation 14)

Alternatively, if $u_b$ were supplied to the adaptation processor instead of $x_a$, the term $\Sigma L_i A_i$ may be eliminated from the left hand side of the equation:

(Equation 15)

The transfer functions and variable derivatives in each equation may be expanded as a Taylor series equation in s.

(Equation 16)

(Equation 17)

(Equation 18)

(Equation 18a)

(Higher order terms for $L_u'(s)$ equal zero because $u(s)$ is assumed to be a step.)

(Equation 19)

(Equation 20)

(Equation 21)

(Equation 22)

(Equation 23)

(Equation 24)

The model equation may be expanded by multiplying the terms in the Taylor series and grouping common terms. For convenience the high order terms have been truncated.

(Equation 25)

Illustrating the expansion of the model equation in terms of the series with the equation in $X_a$ and truncating higher order terms:

(Equation 26)

The resulting equation may then be separated into equations from the terms having the same powers of s:

(Equation 27)

(Equation 28)

The resulting equations do not have a unique solution. The projection procedure described below yields solutions for the model change terms $e_{m0}$, $e_{i0}$, $e_{u0}$, $e_{m1}$, $e_{i1}$, and $e_{u1}$ that offset the current solution from the previous solution. The Taylor series coefficients ($x_{a0}$, $y_0$, $l_{i0}$, $x_{a1}$, $y_1$, $l_{i1}$, and so on for the remaining terms) are computed from the signal ($x_{a0}$, $x_{a1}$, from $x_a$), the process measurement ($y_0$, $y_1$ from $y(t)$), and the feedforward signals ($l_{i0}$, $l_{i1}$ from $l_i(t)$) by the earlier expressions for moments.

Once the disturbance settles, the model change terms are updated. Since the model is linear, solutions may be represented as linear subspaces in a space of model coefficients. The dimension of the model space is equal to the product of the number of process variables in the chosen model, and the number of moments used in compensation. In the present model, if one moment is used, there is one axis for the measurement signal, one axis for the unmeasured load and one axis for each measured load. If two moments are used, there are two axes for each signal and load. Any point in a solution subspace gives zero model error for the just settled transient. For different transients, different points in a particular solution space may give model error and may not compensate well. The problem is to converge successive solutions to a point correctly compensating all conditions.

The projection method determines a single solution in a new solution space that is closest to the existing solution. Where a load variable was not upset, the associated compensation value is not altered. Considering the axes in terms of the errors in the current solution is convenient.

The current solution is then the origin of the solution space, and the new solution corresponds to the increments to be added to the current solution to generate an updated solution. For a single load, single moment system (i.e., a single gain model), a three dimensional space may be used with axes for the measurement change, $e_{y0}$, the unmeasured load $e_{i0}$, and a single load measurement change, $e_{l0}$. Adding additional loads adds additional error axes corresponding to $e_{i0}$. The solution space (in the one moment case) is the plane determined by the model relation:

(Equation 29)

An updated solution in the error space is computed by projecting from the origin (0, 0, 0) to the nearest solution of the equation being solved. The nearest solution is the point ($e_{u0}$, $e_{i0}$, $e_{m0}$) computed by standard means as:

(Equation 30)

(Equation 31)

(Equation 32)

The error computations define the update values for the compensator moments. The set of solutions for one moment, and multiple loads, can be recast in vector form with the following vector definitions:

(Equation 33)

(Equation 34)

(Equation 35)

(Equation 36)

With these definitions the previous solution calculations can be restated as the single vector equation:

(Equation 37)

The updated solution ($e_u$, $e_i$, $e_y$) is closer to or the same distance from the ideal value than the prior solution (0, 0, 0). If the prior solution is in the same solution subspace as the present equation, the solution point does not move. The method gives a solution even though there are fewer equations than unknowns. The new solution affects only the compensator values of the process variables affected by the disturbance, and the magnitude of the change is least when the data least justifies change. For a system having additional loads, additional axes are added but the procedure remains the same.

Where additional moments are considered, the solution subspace has the dimension of the parameter space minus the number of moment equations. Since there are more parameters than moments, the dimension of the solution space is greater than zero.

The preferred design takes the equation for the $s^0$ terms:

(Equation 38)

To Equation 38 are added the additional equation of the $s^1$ terms:

(Equation 39)

If additional moments are computed the corresponding additional equations are included. In the preferred method, the solution is found by projecting from the error space origin to the nearest point in the subspace formed by intersection of the two or more equations.

The error vector E has dimension of the number of loads n plus one, times the number of moments $(1(n+1)(m)$.

(Equation 40)

The vector U has dimension of the number of moments (m);

(Equation 41)

The array B has dimension of moments by the number of loads plus two (one for the unmeasured load $l_{u0}$), and one for the measurement, times the number of moments (m), $(n+2)(m)$.

(Equation 42)

The array H has dimension of moments by the loads plus one for the measurement, times the moment (m), $(n+1)(m)$.

(Equation 43)

With the matrix definitions, the solution calculations can be stated with the same algebraic form but the symbols representing vectors and matrices:

(Equation 44)

If more than two moments are addressed, the matrix equations are extended with additional columns: the matrices B and U have one column for each equation to be solved; one column for each level of moment calculated. If more than one feedforward signal is accommodated, the effect is to introduce a number of unknowns equal to the product of the number of levels of moments calculated times the quantity two plus the number of feedforward signals.

Applicants prefer a two moment space which gives the following specific projection calculations resulting from the model solution developed. The terms on the right side are all calculated directly from the moments of the signals.

a. computing $S_0$, $S_1$, $S_{01}$, and Del by the equations:

(Equation 45)

(Equation 46)

(Equation 47)

(Equation 48)

b. computing adjusted control signal moments, $u_0$, $u_1$, by the equations:

(Equation 49)

(Equation 50)

c. computing adaptation coefficients, $b_0$, $b_1$, by the equations:

(Equation 51)

(Equation 52)

d. computing for each feedforward compensator the updated compensator coefficients, $a_{i0}$, $a_{i1}$, by the equations:

(Equation 53)

(Equation 54)

e. computing, for the next adaptation, the inverse process, $a_{y0}$, $a_{y1}$, by the equations:

(Equation 55)

(Equation 56)

f. computing, from each pair of compensator moments corresponding compensator parameters for the compensator transfer function, for example a lead lag compensator with coefficients $a_{i0}$ and $a_{i1}$ (Equation 57)

(expressed with the Taylor Series), and a fixed lead lag ratio G, by the equations:

(Equation 58)

(Equation 59)

If the manipulated path has excess delay, T is usually set to zero, since a lead cannot cancel delay. The quadratic compensator can be used when the local path has excess delay or lag. The solution to Equation 58 is then:

(Equation 60)

(Equation 61)

Other solution points may be selected. The previous solution space may be retained, and a point in the intersection between the current and previous solution spaces used as the new solution. The nearest intersection point is preferred but a vector combination of the nearest intersection point and the previous solution point is also acceptable. Where no intersection occurred, the nearest point projection may be used. Generally, selecting a weighted vector combination of the current and previous solutions is considered within the skill of those practicing the art, given the present disclosure.

The unmeasured load signal occupies a special role in the design. The explicit assignment of a likely unmeasured load step size is unusual in adaptive systems. Specifically including parameters in the process model for unmeasured load effects, allows the other parameters to remain nearly constant when the measured load changes are small.

The unmeasured bond pass filtered load $l_u$ derivative is treated as an impulse, with area $l_{u0}$, occurring at the start of the disturbance, and operated on by a corresponding ideal unmeasured load compensator $A_u$. The unmeasured load signal's low order term, $l_{u0}$ is set as a constant representing the likely magnitude of unmeasured disturbances. The value of the unmeasured load $l_{u0}$ may then be chosen to be a factor times the noise threshold used to detect a measured disturbance. The higher order moments of the unmeasured load signal $l_u$ are set to zero $l_{uj}=0$ for j greater than zero.

While the unmeasured load $l_u$ in the model formally represents an unmeasured disturbance load, in the projection process, the unmeasured disturbance load $l_u$ controls the rate of adaptation. A small value of $l_{u0}$, for example a value much smaller than the low order terms of the measured loads $l_{i0}$, means most of the disturbance is attributed to the measured loads and little is attributed to unmeasured causes. The result is nearly a complete adaptation within one disturbance. A large value of $l_{u0}$, for example a value much larger than the low order terms of the measured loads $l_{i0}$, means most of the disturbance is attributed to the unmeasured load and little is attributed to the measured causes. The adaptation as a result slows, needing many disturbances to converge, but the resulting adaptation is an average of the many disturbances.

The process model may be expressed alternatively in terms of the feedback control signal $u_b(t)$ instead of the final control signal $x_a(t)$ and the corresponding Taylor series or moment equations develop similarly. When expressed in terms of the feedback signal $u_b$, the compensation is assumed to be used, and therefore the process control 18 must not saturate. In either case, the computation includes a number of moments for each signal equal to the number of dynamic compensation coefficients to be adapted in each compensator transfer function.

The control effect of the unmeasured load value $l_{u0}$ can be illustrated where the steady state feedforward control with multiple disturbances the solution takes the form:

(Equation 62)

The effect of large and small values for the measured loads $l_{i0}$ and the unmeasured load $l_{u0}$ may be compared in the equation. If unmeasured load $l_{u0}$ is small compared to measured loads $l_{i0}$, then adaptation of $l_{i0}$ is relatively independent of the unmeasured load $l_{u0}$. If the unmeasured load $l_{u0}$ is large compared to $l_{i0}$ then adaptation of $l_{i0}$ is slowed. Thus if the unmeasured load $l_{u0}$ is set to correspond to small unmeasured disturbances then adaptation stops when $l_{i0}$ is zero, proceeds slowly when $l_{i0}$ is small, and proceeds rapidly if $l_{i0}$ is large. The preferred setting for unmeasured load constant $l_{u0}$ is then a value greater than the expected signal noise, and less than signal variations deemed significant. Setting $l_{u0}$ to the error noise threshold is preferred. An enhancement is to calculate a value for the unmeasured load constant $l_{u0}$ from signal statistics or from convergence methods. The action of unmeasured load value $l_{u0}$ is essentially unchanged when higher moments are included.

The projection method calculates the smallest sum of weighted squared changes in the model parameters satisfying the $s^0$ and $s^1$ model equations relating the inputs and outputs. The zeroth terms for the unmeasured load $l_{u0}$, process measurement $y_0$, final control signal $v_0$, and feedforward disturbances $l_{i0}$, are measured as a percentage of full scale signal so are dimensionless. The corresponding zeroth compensation coefficients $a_{i0}$, $a_{y0}$ and $a_{u0}$ are also dimensionless. The higher order series terms, the first and subsequent compensator terms, have been normalized with a time factor $t_c$, a characteristic recovery time for the closed loop. The time factor $t_c$ affects the distance measured in the parameter space and therefore the rate of convergence of the projection method.

Typically, the absolute value of the feedback compensation coefficient $a_{y0}$ lies in a range from zero, for a dominant lag process, to one, for a dominant delay process. The scale factors for the final control signal $y(t)$ and the measured loads $l_i(t)$ are likely to be chosen so the scaled final control signal $x_a(t)$ change is not greater than the scaled change in the disturbance variable $l_i(t)$, which implies a compensator coefficient value, $a_{y0}$, between $-1$ and $1$. The time factor $t_c$ should be chosen so the higher order compensation coefficients $a_{y1}$, $a_{i1}$ and $a_{u1}$ and above fall in a similar range. Numerically, the normalizing time constant is chosen to scale terms to be close to one so a change of a given magnitude in any one of the coefficients causes a comparable change in the $s^0$ and $s^1$ equations. A useful time constant is the closed loop characteristic time, $t_c$ of the feedback control loop.

The closed loop characteristic time is the coefficient of the $s^1$ term in the closed loop characteristic equation (the denominator of the closed loop transfer function).

For the closed loop process without disturbances:

(Equation 63)

For a typical PID controller (Equation 64)

where:
u(s) = feedback controller output
s(s) = set point
y(s) = measurement
I = integral time
D = derivative time
f = derivative filter factor, typically 0.1
P = proportional band solving for the measurement y by eliminating feedback output u gives:

(Equation 65)

The closed loop characteristic time is then (Equation 66)

Feedback controllers may be parameterized differently requiring a different calculation to achieve the closed loop characteristic time. Time scaling is not necessary but may be preferred as scaling helps speed convergence.

Figure 4:
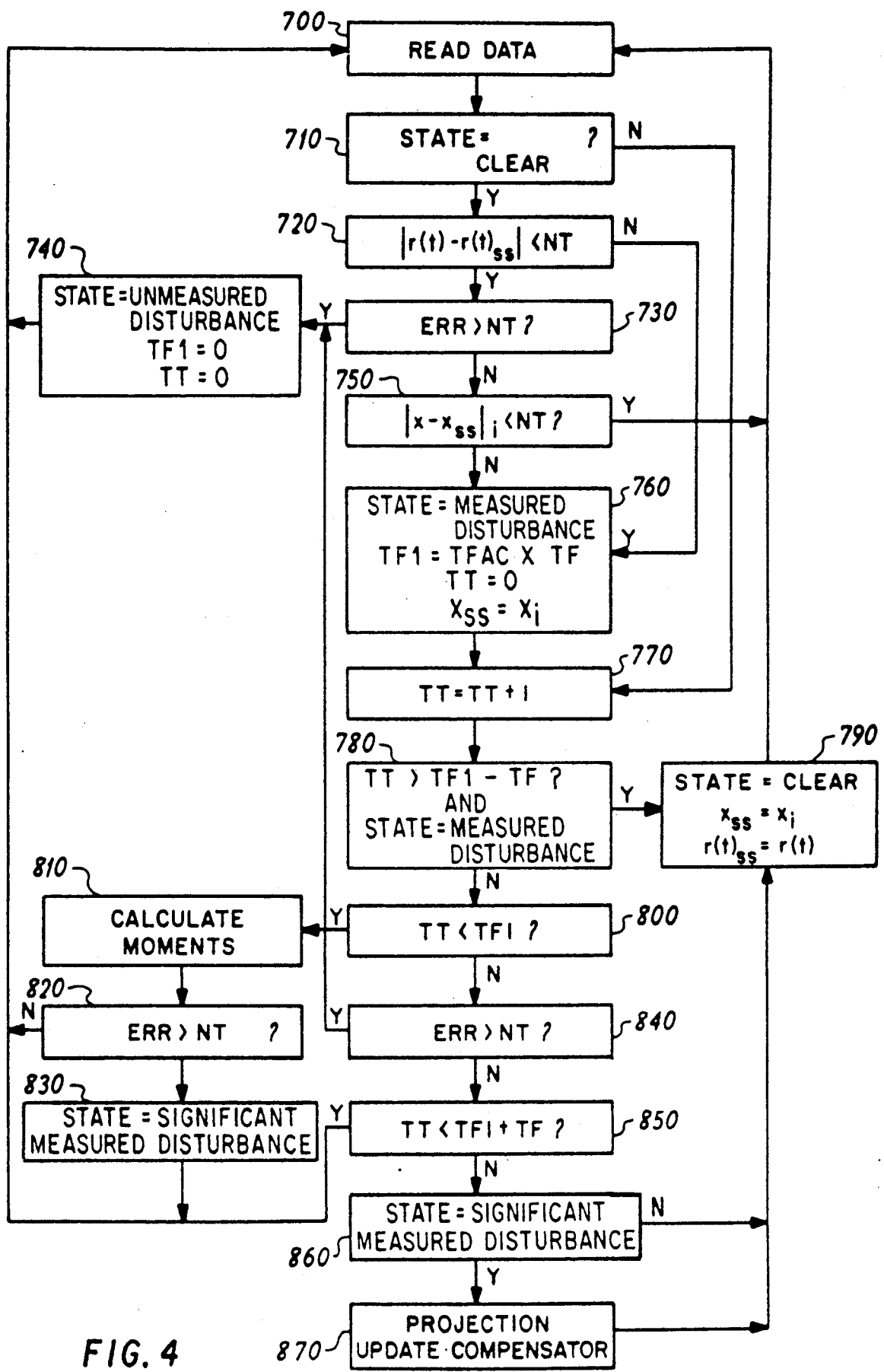
FIG. 4 is a flow chart of preferred processing steps.

A preferred process is shown in flow chart form in FIG. 4.

Current signal samples for the loads $l_i(t)$, the measurement signal $y(t)$, the set point signal $r(t)$, and the feedback control signal $u_b(t)$ are periodically taken 700. The measured loads $l_i(t)$ and set point signal $r(t)$ are treated as a group, the measured group. Feedback control parameters are also read from the feedback controller 84. A state flag is tested to determine if a previously detected disturbance condition exists 710. Four disturbance states are possible: no disturbance, a disturbance in the measured group, a disturbance not in the measured group (called an unmeasured group disturbance), and a significant disturbance in the measured group. Once a disturbance is detected, and the program set up for monitoring and characterizing the disturbance, successive samples are processed directly. Then, testing each sample for a disturbance is avoided. Where no disturbance is in progress, the absolute value of the set point signal $r(t)$ change is compared with a noise threshold NT to detect a significant set point change 720.

If a significant set point signal $r(t)$ change is not detected 720, the absolute control error ERR, which is the absolute value of the difference between the set point signal $r(t)$ and the measurement signal $y(t)$, is computed and compared with the noise threshold NT 730. If the control error ERR exceeds the noise threshold NT, an unmeasured group disturbance is determined and the feedforward compensators are not updated. The state flag is set to indicate an unmeasured group disturbance 740. The disturbance response time, TF1, is set to zero and a total disturbance timer TT is set to zero, since the disturbance response is just starting 740. The next sample is then sought 700.

If the control error ERR is within the noise band 730, then all of the load signals $l_i(t)$ are tested to detect a measured group disturbance 750. The absolute value of the difference between each current load value $l_i(t)$ and the load's previous steady state value $l_i(t)_{ss}$ is compared with a noise threshold NT. If none of the load signals $l_i(t)$ indicate a disturbance, no measured group disturbance is indicated and the next sample is sought 700.

On detecting a set point 720 or load disturbance 750, the state flag is set to indicate a measured group disturbance. Since the disturbance start is being detected, the total disturbance timer TT is set to zero, and the steady state signal values $r(t)_{ss}$, $l_i(t)_{ss}$ are updated with the previous sample value 760.

The determination of the disturbance response end relies on an estimate of the disturbance response period made at the beginning of the disturbance. A fixed estimate of the disturbance response period TF1 is set during which the disturbance is allowed to develop. The period estimate TF1 is set to the product of a user specified time factor TFAC, and the closed loop characteristic time factor $t_c$ (or as labeled for the program: TF) calculated from the feedback controller and one of the identified process parameters, the zeroth moment term for the controlled variable $a_{y0}$. The user specified time factor, usually three, is chosen to correlate completion of the response of the closed loop process 16 with the feedback loop characteristic time, TF.

The total disturbance timer TT is increased once for each sample during the disturbance response 770.

A test is made 780 to see if, within a reasonable time period, the disturbance response has been measured as significant. With applicants' determination of a likely maximum time for the disturbance response duration, the disturbance error response should peak by the maximum time estimate TF1 minus the closed loop characteristic time TF. If the total disturbance time has approached within one characteristic loop time of the estimated disturbance response maximum TF1 while the state is still "measured disturbance" and a significant control error has not been found, then the compensation for the disturbance is deemed adequate. Improving the feedforward adaptation is unnecessary, so the update is aborted, and the state conditions are reset 790. The disturbance flag is cleared, the previous steady state load values $l_i(t)_{ss}$ are updated with the current values $l_i(t)$, and the previous steady state set point value $r(t)_{ss}$ is updated with the current value r(t) 790. The next sample is then sought 700.

If the total disturbance timer TT does not exceed the adjusted time factor 780, or if the disturbance response has been registered as significant, then the total disturbance timer TT is compared with the estimated period TF1 800. While the total disturbance time TT is less than the estimated period TF1, the load signal $l_i(t)$, output $x_a(t)$, and measurement signal y(t) signals are characterized. Here the moment values for the load signals $l_i(t)$, measurement signal y(t) and output $x_a(t)$ signal are computed 810. A test is then made to determine if the control error ERR exceeds the noise threshold NT 820. If the control error ERR is less than the threshold NT, the next sample is sought 700. If the control error ERR exceeds the threshold NT 820, then the state flag is set to indicate the disturbance response is significant and merits correcting by adaptation 830. The next sample is then sought 700.

If the total disturbance timer TT exceeds the estimated disturbance time TF1 800, then the control error ERR is compared with the noise threshhold NT 840. A second and delayed disturbance may cause misidentification so applicants abort the adaptation of a response spoiled by a disturbance response which has not settled in the alotted time. If the control error ERR exceeds the noise threshhold 840, the adaptation is then aborted and treated as an unmeasured disturbance response 740.

If the control error ERR does not exceed the noise threshhold 840, then a settling period is tested for. The total disturbance timer TT is compared with the estimated disturbance time TF1 plus a settling period to detect the presence of an unsettled response. The closed loop characteristic time TF is a convenient settling period measure. If the total disturbance timer TT does not exceed the disturbance estimate TF1 plus the additional settling period limit, the next sample is sought 700.

If the total disturbance timer TT exceeds the disturbance plus settling estimate 850, then the projection process is pursued 870.

The moment values are used in the projection process, to determine new compensator coefficients. The compensators are then updated. The state conditions are reset for processing the next disturbance 790. The settled signal values $l_i(t)$, and set point signal r(t) are stored as steady state values $l_i(t)_{ss}$, $r(t)_{ss}$ and the state flag reset to no disturbance 790. The next sample is sought 700, and disturbance seeking restarted.

One of the advantages of the present apparatus and method is the ability of the feedforward controllers to partially decouple interacting loops. Load, measurement and actuator signals in one loop may act as load inputs in another loop, and vice versa. In such a structure with the present apparatus and method, the feedbacks and feedforwards of each loop may be adapted independently of the other loops, unlike existing designs which may require a single inflexible and monolithic treatment of the whole loop system.

While there have been shown and described what at present are considered to be the preferred embodiments of the invention, it will be apparent to those skilled in the art that various changes and modifications can be made herein without departing from the scope of the invention defined by the appended claims, as in the following examples.

The equipment organization and timing may be altered. In particular, the disturbance detection, and characterization is separable as is the compensation and update portions. Other end conditions may be alternatively established. For example, presuming the curve has a dominant peak, the end may be set as twice or more the time to the peak.

Although the differentiator 48, adaptation processor 62, compensator 54, integrator 58, summer 34 and feedback processor 26, 84 are shown separately, the units may be variously grouped, or combined as a single unit. A particular advantage of the present invention is that the feedback function group is separable from the feedforward function group with minimal cross coordination between the two function groups. As shown any standard feedback controller 26 with integral action may be combined with the feedforward units without having to adjust or reprogram the adaptation processor 62, compensator 54, or process control 18 units.

The implementations shown in FIGS. 1, 2 and 3 are illustrations and variations from them are possible. In particular, the set point signal r(t) may be directed to the adaptation compensator 62. The feedback control signal $u_b(t)$ may be taken from the feedback controller 84, or an external feedback control signal $x_b$ 36. The load signals may derive from other control devices and not just load sensors.

APPENDIX $$y'(t) = y(t) - y(t-1) \qquad (1)$$

$$x_a'(t) = x_a(t) - x_a(t-1) \qquad (2)$$

$$u_b'(t) = u_b(t) - u_b(t-1) \qquad (3)$$

$$l_i'(t) = l_i(t) - l_i(t-1). \qquad (4)$$

$$M_n(y') = \sum_{j=0}^{m} [(-j/t_c)^n/n!][y(j) - y(j-1)] \qquad (5)$$

$$M_n(x_a') = \sum_{j=0}^{m} [(-j/t_c)^n/n!][y(j) - y(j-1)] \qquad (6)$$

$$M_n(u_b') = \sum_{j=0}^{m} [(-j/t_c)^n/n!][u_b(j) - u_b(j-1)] \qquad (7)$$

$$M_n(l_i') = \sum_{j=0}^{m} [(-j/t_c)^n/n!][l_i(j) - l_i(j-1)] \qquad (8)$$

$$Y = (x_a - L_u A_u - \Sigma L_i A_i)(A_y)^{-1} \qquad (9)$$

$$Y A_y = x_a - L_u A_u - \Sigma L_i A_i \qquad (10)$$

$$E_u = A_u(k) - A_u(k-1) \qquad (11)$$

$$X_a(k) = YA_y(k) + L_u A_u(k) + \Sigma L_i A_i(k) = Y(A_y(k-1) - \qquad (12)$$

$$E_y) + L_u(A_u(k-1) + E_u) - \Sigma L_i A_i(k-1) - E_i)$$

-continued
APPENDIX $$X_a(k) - YA_y(k-1) - L_u A_u(k-1) - \Sigma L_i A_i(k-1) = \quad (13)$$
$$YE_y + L_u E_u + \Sigma L_i E_i$$

$$x_a - \Sigma L_i A_i - YA_y = L_u E_u + YE_y + \Sigma L_i E_i \quad (14)$$

$$U_b - YA_y = L_u E_u + YE_y + \Sigma l_i E_i \quad (15)$$

$$Y(s) = y_0 + y_1 s + y_2 s^2 \ldots \quad (16)$$

$$U_b'(s) = u_{b0} + u_{b1} s + u_{b2} s^2 \ldots \quad (17)$$

$$X_a'(s) = x_{a0} + x_{a1} s + x_{a2} s^2 \ldots \quad (18)$$

$$L_u'(s) = l_{u0} \quad (18a)$$

$$L_i(s) = l_{i0} + l_{i1} s + l_{i2} s^2 \ldots \quad (19)$$

$$A_i(s) = a_{i0} + a_{i1} s + a_{i2} s^2 \ldots \quad (20)$$

$$A_y(s) = a_{y0} + a_{y1} s + a_{y2} s^2 \ldots \quad (21)$$

$$E_u(s) = e_{u0} + e_{u1} s + e_{u2} s^2 \ldots \quad (22)$$

$$E_i(s) = e_{i0} + e_{i1} s + e_{i2} s^2 \ldots \quad (23)$$

$$E_y(s) = e_{y0} + e_{y1} s + e_{y2} s^2 \ldots \quad (24)$$

$$(x_{a0} - l_{i0} a_{i0} - y_0 a_{y0}) + (x_{a1} - l_{i0} a_{i1} - l_{i1} a_{i0} - y_0 a_{y1} - \quad (25)$$
$$y_1 a_{y0})s = (l_{u0} e_{u0} + y_0 e_{y0} + l_{i0} e_{i0}) + (l_{u0} e_{u1} + y_0 e_{y1} +$$
$$y_1 e_{y0} + l_{i0} e_{i1} - l_{i1} e_{i0})s$$

$$(x_{a0} + x_{a1} s) - (l_{i0} + l_{i1} s)(a_{i0} + a_{i1} s) - (y_0 + y_1 s)(a_{y0} + \quad (26)$$
$$a_{y1}s) = (l_{u0})(e_{u0} + e_{u1}s) - (y_0 + y_1 s)(e_{y0} + e_{y1}s) +$$
$$(l_{i0} + l_{i1}s)(e_{i0} + e_{i1}s)$$

$$(x_{a0} - \Sigma l_{i0} a_{i0} - y_0 a_{y0}) = (l_{u0} e_{u0} + y_0 e_{y0} + \Sigma l_{i0} e_{i0}) \quad (27)$$

$$(x_{a1} - \Sigma l_{i0} a_{i1} - \Sigma l_{i1} a_{i0} - y_0 a_{y1} - y_1 a_{y0}) = \quad (28)$$
$$(l_{u0} e_{u1} + y_0 e_{y1} + y_1 e_{y0} + \Sigma l_{i0} e_{i1} + \Sigma l_{i1} e_{i0})$$

$$x_{u0} - l_{i0} a_{i0} - y_0 a_{y0} = l_{u0} e_{u0} + l_{i0} e_{i0} + y_0 e_{y0} \quad (29)$$

$$e_{u0} = \frac{l_{u0}(x_{a0} - l_{i0} a_{i0} - y_0 a_{y0})}{(l_{u0})^2 + (l_{i0})^2 + (y_0)^2} \quad (30)$$

$$e_{i0} = \frac{l_{i0}(x_{a0} - l_{i0} a_{i0} - y_0 a_{y0})}{(l_{u0})^2 + (l_{i0})^2 + (y_0)^2} \quad (31)$$

$$e_{y0} = \frac{y_0(x_{a0} - l_{i0} a_{i0} - y_0 a_{y0})}{(l_{u0})^2 + (l_{i0})^2 + (y_0)^2} \quad (32)$$

$$E = [e_{10}, e_{20}, e_{30}, \ldots, e_{y0}]^T \quad (33)$$

$$U = [x_{a0} - (l_{10} a_{10} + l_{20} a_{20} + l_{30} a_{30} + \ldots) - y_0 a_{y0}] \quad (34)$$

$$B = [l_{u0}, l_{10}, l_{20}, l_{30}, \ldots, y_0]^T \quad (35)$$

$$H = [l_{10}, l_{20}, l_{30}, \ldots, y_0]^T \quad (36)$$

$$E = H(B^T B)^{-1} U \quad (37)$$

$$x_{a0} - (l_{10} a_{10} + \ldots) - y_0 a_{y0}) = (l_{u0} e_{u0} + y_0 e_{y0} + \quad (38)$$
$$(l_{10} e_{10} + \ldots))$$

$$x_{a1} - (l_{10} a_{11} + \ldots) - (l_{11} a_{10} \ldots) - y_0 a_{y1} - y_1 a_{y0}) = \quad (39)$$
$$l_{u0} e_{u1} - y_0 e_{y1} + y_1 e_{y0} + (l_{10} e_{11} + \ldots) + (l_{11} e_{10} + \ldots)$$

$$E = [e_{10}, e_{20}, e_{30}, \ldots, e_y, e_{11}, e_{21}, e_{31}, \ldots, e_{y1}]^T \quad (40)$$

-continued
APPENDIX $$U = \begin{bmatrix} x_a - \left(\sum_{i=0}^{n} l_{i0} a_{i0}\right) - y_0 a_{y0} \\ x_{a1} - \left(\sum_{i=0}^{n} l_{i0} a_{i1}\right) - y_0 a_{y1} - \left(\sum_{i=0}^{n} l_{i1} a_{i0}\right) - y_1 a_{y0} \end{bmatrix}^T \quad (41)$$

$$B = \begin{bmatrix} l_{u0} l_{10} l_{20} l_{30} \ldots y_0 \; 0 \; 0 \; 0 \; 0 \ldots 0 \\ 0 \; l_{11} l_{21} l_{31} \ldots y_1 l_{u0} l_{10} l_{20} l_{30} \ldots y_0 \end{bmatrix}^T \quad (42)$$

$$H = \begin{bmatrix} l_{10} l_{20} l_{30} \ldots y_0 \; 0 \; 0 \; 0 \ldots 0 \\ l_{11} l_{21} l_{31} \ldots y_1 l_{10} l_{20} l_{30} \ldots y_0 \end{bmatrix}^T \quad (43)$$

$$E = H(B^T B)^{-1} U \quad (44)$$

$$S_0 = \Sigma(l_{i0}^2) + y_0^2 + l_{u0}^2 \quad (45)$$

$$S_1 = \Sigma(l_{i1}^2) + y_1^2 \quad (46)$$

$$S_{01} = \Sigma(l_{i0} l_{i1}) - y_0 y_1 \quad (47)$$

$$Del = S_0^2 - S_0 S_1 - S_{01}^2 \quad (48)$$

$$U_0 = x_{a0} - \Sigma(l_{i0} a_{i0}) - y_0 a_{y0} \quad (49)$$

$$U_1 = x_{a1} - \Sigma(l_{i0} a_{i1} + l_{i1} a_{i0}) - y_0 a_{y1} - y_1 a_{y0} \quad (50)$$

$$b_0 = [(S_0 + S_1)U_0 - S_{01} U_1]/Del \quad (51)$$

$$b_1 = (S_0 U_1 - S_{01} U_0)/Del \quad (52)$$

$$a_{i0} = a_{i0} - e_{i0} = a_{i0} - b_0 l_{i0} - b_1 l_{i1} \quad (53)$$

$$a_{i1} = a_{i1} + e_{i1} = a_{i1} - b_1 l_{i0} \quad (54)$$

$$a_{y0} = a_{y0} + e_{y0} = a_{y0} + b_0 y_0 - b_1 y_1 \quad (55)$$

$$a_{y1} = a_{y1} + e_{y1} = a_{y1} - b_1 y_0 \quad (56)$$

$$k(Ts - 1)/((T/G)s - 1) = k - k(1 - G)(-Ts/G) \ldots - \quad (57)$$
$$k(1 - G)(-Ts/G)^n = a_{i0} + a_{i1} t_c s \ldots$$

$$k = a_{i0} \quad (58)$$

$$T = a_{i1} t_c G/[k(G - 1)] \quad (59)$$

$$k(1 + Ts + 0.5(Ts)^2) = a_{i0} + a_{i1} t_c s \quad (60)$$

$$T = -a_{i1} t_c / a_{i0} \quad (61)$$

$$e_{i0} = \frac{l_{i0}[x_{a0} - (a_{10} l_{10} + a_{20} l_{20} + \ldots) - a_{y0} y_0]}{l_{u0}^2 + (l_{10}^2 + l_{20}^2 + \ldots) + y_0^2} \quad (62)$$

$$u = (a_{y0} + a_{y1} t_c s \ldots)y \quad (63)$$

$$u = ((1/Is) + 1)(1/P)\left[r(t) - \frac{(1 - (1 - f)Ds)r(t)}{1 + fDs + 0.5(fDs)^2}\right] \quad (64)$$

$$y = \frac{(1 + Is)r}{[1 + (I(1 + Pa_{y0}) + D)s + \ldots]} \quad (65)$$

$$t_c = I(1 + Pa_{y0}) + D \quad (66)$$

remainder deleted $$lag = \frac{|a_1/(G - 1)| \, lag + (x')}{(|a_1/(G - 1)| + 1)} \quad (67)$$

$$C_i = Sgn(a_1)(G - 1)((x') - lag) + C_i \quad (68)$$

$$lag = \frac{|a_1/(a_0(G - 1))| \, lag + (x')}{(|a_1/(a_0(G - 1))| + 1)} \quad (69)$$

-continued
APPENDIX $$C_i = a_0(lagG(x' - lag)) + C_i \qquad (70)$$

$$lag = \frac{|a_1/a_0|lag + (x')}{|a_1/a_0| + 1} \qquad (71)$$

$$C_i = a_0 lag + C_i \qquad (72)$$

What is claimed is:

1. An adaptive feedforward controller for use in controlling a process having at least one load input, a measured process state to be controlled, and an actuator affecting the controlled state, the controller comprising:
   A) means for receiving at least one load signal indicating the load input level to the process;
   B) means for receiving a process measurement signal indicating the level the controlled state;
   C) means for receiving a set point signal indicating a desired condition for the controlled state,
   D) means for receiving an actuator measurement signal indicating the actuator level;
   E) means for receiving a feedback control signal responding to the process measurement signal, and the set point signal, the feedback control signal acting on the actuator to affect the process; and
   F) processing means in communication with the load signal, the process measurement signal, the actuator measurement signal, and the set point signal receiving means for performing the operations of
      1) detecting a disturbance start in at least one of the load measurement and set point signals,
      2) characterizing the load measurement signal during a portion of the disturbance,
      3) characterizing the process measurement signal during a portion of the disturbance,
      4) characterizing the actuator signal during the portion of the disturbance,
      5) determining the end of the signal characterizations,
      6) determining coefficients of a model relating the load, process measurement, and actuator signal characterizations,
      7) generating load signal compensation coefficients from the model coefficients for use in load compensators to generate a control signal for use by the actuator in affecting the process.

2. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs; and
   c) relating the characterized inputs and process result output in general transfer function model equations to generate transfer function parameters relating the inputs to the process result output.

3. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs; and
   c) relating the characterized inputs and process result output in general transfer function model equations to generate transfer function parameters relating the inputs to the process result output,
   wherein the transfer function parameters are refined with an occurrence of a successive process disturbance by projecting from the current point in parametric space to the nearest point in a response subspace which nearest point satisfies the model equations for the last detected process disturbance.

4. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs; and
   c) relating the characterized inputs and process result output in general transfer function model equations to generate transfer function parameters relating the inputs to the process result output,
   wherein the transfer function parameters which satisfy the model equations are used to determine the structure of compensators and compensator parameter values wherein the compensators act on the feedforward process inputs to counteract the anticipated effects of a process disturbance on the process disturbance result output.

5. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs;
   c) relating the characterized inputs and process result output in general transfer function model equations to generate transfer function parameters relating the inputs to the process result output; and
   d) refining the transfer function parameters with an occurrence of a successive process disturbance by projecting from the current point in parametric space to the nearest point in a response subspace which nearest point satisfies the model equations for the last detected process disturbance.

6. The method according to claim 5, wherein the transfer function parameters which satisfy the model equations are used to determine the structure of compensators and compensator parameter values wherein the compensators act on the feedforward process inputs to counteract the anticipated effects of a process disturbance on the process result output.

7. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs; and
   c) relating the characterized inputs and process result output in general transfer function model equations to generate transfer function parameters relating the inputs to the process result output,
wherein the process inputs include a set point, further comprising the step of calculating a feedback control signal utilizing a process result output and a set point for that process result in order to correct unmeasured disturbances, incomplete compensation of measured disturbances, and to provide steady-state control.

8. The method according to claim 7, further comprising the step of adaptively determining the end of response transients by using said feedback control signal and the moments in order to determine a closed loop characteristic time.

9. The method according to claim 8, further comprising the step of aborting update of feedforward compensator parameters if the process result output does not remain settled in a time interval defined by the closed loop characteristic time.

10. The method according to claim 8, further comprising the step of using the closed loop characteristic time to set a time constant for filtering the inputs and process result output.

11. The method according to claim 2, further comprising the step of filtering the process result output and the inputs prior to characterizing the transients by moments.

12. The method according to claim 4, wherein the inputs are differentiated prior to compensation and are integrated after compensation such that tuning of compensation parameters will not disturb a steady process.

13. Multivariable adaptive feedforward control of a process having inputs and a process result output, in which the process is subjected to response transients due to process disturbances, wherein feedforward adaptation is accomplished by the method comprising the steps of:
   a) detecting a beginning and ending of the response transients;
   b) characterizing the inputs and process result output during a response transient by moments which comprise time-weighted integrals performed on the process result output and inputs; and
   c) relating the characterized inputs and process result output in general transfer function model equations to generate transfer function parameters relating the inputs to the process result output,
further comprising the steps of generating a feedback control signal and integrating the characterized input signals and the feedback control signal in a single integrator in order to avoid integrator drift.

14. The method according to claim 4, further comprising the step of deploying the compensators in a control structure whereby measured input signals are differentiated prior to being processed by the compensators and then integrated so that a steady process is not disturbed.

15. An adaptive feedforward controller for use in controlling a process having at least one load input, a measured process state to be controlled, and an adjustable actuator affecting the controlled state, the controller comprising:
   a) means for receiving at least one disturbance signal affecting the process;
   b) mean for receiving a process controlled measurement signal as a controlled variable;
   c) means for receiving a set point signal indicating a desired value for the controlled variable;
   d) means for determining the value of a manipulated variable indicating the actuator adjustment;
   e) means for producing a feedback control signal in response to a process control error which corresponds to the difference between the process controlled measurement signal and the set point signal; and
   f) means in communication with the disturbance signal, the process controlled measurement signal, the manipulated variable, and the set point signal receiving means for performing the processing operations of
      i) detecting a disturbance start in at least one of the disturbance signal and the set point signal,
      ii) characterizing the disturbance signal during a portion of the disturbance,
      iii) characterizing the process controlled measurement signal during a portion of the disturbance,
      iv) characterizing the manipulated variable during the portion of the disturbance,
      v) determining an end of the signal characterizations,
      vi) determining coefficients of a process model relating the disturbance, the process controlled measurement, and the manipulated variable, and
      vii) generating a disturbance signal compensator structure and coefficients from the model coefficients for use in disturbance compensators to generate a control signal for use with the manipulated variable to control the process.

16. The apparatus of claim 15, further comprising compensation means coupled to receive the coefficients generated by the processing means, and having disturbance compensators operating with the coefficients on the disturbance signals to generate a control signal for use by the actuator in affecting the process.

17. The apparatus of claim 15, further comprising means for differentiating disturbance compensator signals and means for integrating the control signal for use by the actuator in affecting the process.

18. The apparatus of claim 15, wherein the means for detecting a disturbance start comprises means for determining a steady-state value for each of the load and set point signals and means for comparing the steady-state signal value with a current value for the corresponding signal to indicate a difference indicating the start of a disturbance in the signals.

19. The apparatus of claim 18, wherein the means for detecting a disturbance further comprises means for determining that the signal difference exceeds a threshold amount.

20. The apparatus of claim 19, wherein the threshold amount corresponds to a measure of normal variance in the respective signal.

21. The apparatus of claim 19, wherein the threshold amount corresponds to a measure of normal variance in the process control error.

22. The apparatus of claim 15, wherein all of the signals are filtered identically to remove these signed components which would prevent the integrals from converging to a steady-state value by the end determination.

23. The apparatus of claim 15, wherein the means for characterizing comprises means for calculating for each of the disturbance variable, process controlled measurement, and manipulated variable signals at least one term of a series of weighted time integrals from the start of the disturbance to the end determination.

24. The apparatus of claim 23, wherein the means for characterizing further comprises means for relating the series of weighted time integrals to corresponding coefficients of a Tyalor series of the Laplace transform series of the respective signals in order to derive equations to characterize a process model.

25. The apparatus of claim 24, wherein the weighted time integral is a moment calculation from the start of the disturbance to the end determination.

26. The apparatus of claim 25, wherein the moment calculations include at least corresponding portions of the disturbance signals, the process controlled measurement signal, and the manipulated variable signal between the disturbance start and end determination.

27. The apparatus of claim 26, wherein the moment calculations are calculated respectively for each sample by the expressions:

$$M_n(y') = \sum_{j=0}^{j=e} [(-jt_p/t_c)^n/n!][y(j) - y(j-1)]$$

$$= \int_0^{t_e} (-t/t_c)^n (d_y/d_t) dt$$

$$M_n(v') = \sum_{j=0}^{j=e} [(-jt_p/t_c)^n/n!][v(j) - v(j-1)]$$

$$= \int_0^{t_e} (-t/t_c)^n (d_v/d_t) dt$$

$$M_n(l_i) = \sum_{j=0}^{j=e} [(-jt_p/t_c)^n/n!][l_i(j) - l_i(j-1)]$$

$$= \int_0^{t_e} (-t/t_c)^n (d_{li}/d_t) dt$$

respectively, where
$x'_{N+1}$ = the derivative of the controlled variable
$u'$ = the derivative of the manipulated variable
$x'_i$(o i n) = the derivatives of the disturbance signals
n = a positive integer or zero for the degree of the moment
y = the controlled variable
v = the manipulated variable
$l_i$ = the disturbance signal
$t_c = (I(1 + a_{m0}, 0*P) + D)$
e = end value for n
$t_e$ = end time
$t_p$ = computing interval 28. The apparatus of claim 27, wherein the moment calculations are scaled by a time factor $t_c$ from between one quarter of an expected disturbance response time constant to four times an expected disturbance response time constant.

29. The apparatus of claim 28, wherein the time factor is a closed loop characteristic:

$$t_c = (I(1 + a_{m0}, 0*P) + D)$$

where
I = PID integral time
D = PID derivative time
P = PID proportional band, as a decimal
$a_{m0}$ = identified coefficient related to the measurement signal y(t)

30. The apparatus of claim 15, wherein the means for determining the end of the signal characterizations comprise means for determining all of the respective disturbed signals have returned to a steady-state condition.

31. The apparatus of claim 30, further comprising means for determining that the respective signals are all within a steady-state condition during a time period.

32. The method according to claim 5, wherein the process inputs include a set point, further comprising the step of calculating a feedback control signal utilizing a process result output for that process result output in order to correct unmeasured disturbances, incomplete compensation of measured disturbances, and to provide steady-state control.

33. The method according to claim 5, wherein the process inputs include a set point, further comprising the step of calculating a feedback control signal utilizing a desired set point for that process result output in order to correct unmeasured disturbances, incomplete compensation of measured disturbances, and to provide steady-state control.

34. The method according to claim 5, further comprising the step of calculating a feedback control signal utilizing a process result and a desired set point for that process result.

35. The apparatus in claim 15, wherein the model comprises an adjustable factor corresponding to an unmeasured load term.

36. The apparatus in claim 15, wherein the solution point is positioned between the intersection of the current solution to the model equations and the next previous solution.

37. The apparatus in claim 36, wherein the solution point is the point in the current solution space of the model equations nearest the previous solution to the model equations.

* * * * *